United States Patent
Lungwitz et al.

(10) Patent No.: US 6,762,154 B2
(45) Date of Patent: Jul. 13, 2004

(54) VISCOELASTIC SURFACTANT FLUIDS STABLE AT HIGH BRINE CONCENTRATIONS

(75) Inventors: Bernhard Lungwitz, Stafford, TX (US); Mark E. Brady, Sugar Land, TX (US); Sylvie Daniel, Sugar Land, TX (US); Mehmet Parlar, Sugar Land, TX (US); Colin J. Price-Smith, Missouri City, TX (US); Elizabeth Morris, Aberdeen (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 95 days.

(21) Appl. No.: 09/918,264

(22) Filed: Jul. 30, 2001

(65) Prior Publication Data

US 2002/0033260 A1 Mar. 21, 2002

Related U.S. Application Data

(63) Continuation-in-part of application No. 09/667,073, filed on Sep. 21, 2000, now abandoned.

(51) Int. Cl.[7] ............................. C09K 7/02; E21B 43/26
(52) U.S. Cl. ..................... 507/131; 507/141; 507/145; 507/135; 507/134; 507/240; 507/241; 507/244; 507/252; 507/259; 507/267; 507/276; 507/277; 507/922; 507/927; 166/308; 166/278; 166/312
(58) Field of Search ................................. 507/131, 141, 507/145, 134–135, 240–241, 244, 252, 259, 267, 276–277, 922, 927; 166/308, 278, 312

(56) References Cited

U.S. PATENT DOCUMENTS

| | | | |
|---|---|---|---|
| 4,695,389 A | | 9/1987 | Kubala .................. 252/8.553 |
| 4,725,372 A | * | 2/1988 | Toet et al. ................ 507/240 |
| 4,735,731 A | * | 4/1988 | Rose et al. ............... 507/246 |
| 4,945,991 A | | 8/1990 | Jones ...................... 166/278 |
| 5,009,799 A | | 4/1991 | Syrinek et al. ........ 252/8.553 |
| 5,486,312 A | | 1/1996 | Sandiford et al. ...... 252/315.1 |
| 5,551,516 A | * | 9/1996 | Norman et al. ............. 507/244 |
| 5,964,295 A | | 10/1999 | Brown et al. ............. 166/308 |
| 5,979,557 A | | 11/1999 | Card et al. ............... 166/300 |
| 6,140,277 A | | 10/2000 | Tibbles et al. ............ 507/201 |
| 6,258,859 B1 | * | 7/2001 | Dahayanake et al. ...... 507/922 |
| 6,263,967 B1 | | 7/2001 | Morris et al. ............. 166/312 |
| 6,399,546 B1 | | 6/2002 | Chang et al. ............. 507/240 |
| 6,412,561 B1 | * | 7/2002 | Brown et al. ............. 166/308 |
| 6,435,277 B1 | * | 8/2002 | Qu et al. .................. 507/240 |
| 6,436,880 B1 | | 8/2002 | Frenier .................... 507/244 |
| 6,482,866 B1 | * | 11/2002 | Dahayanake et al. ....... 516/77 |
| 6,667,280 B2 | * | 12/2003 | Chang et al. ............. 507/240 |
| 2001/0036905 A1 | * | 11/2001 | Parlar et al. ............. 507/200 |
| 2002/0004464 A1 | | 1/2002 | Nelson et al. ............ 507/200 |

FOREIGN PATENT DOCUMENTS

| | | |
|---|---|---|
| WO | 98/56497 | 12/1998 |
| WO | 01/18147 | 3/2001 |
| WO | 02/12673 | 2/2002 |

* cited by examiner

Primary Examiner—Philip C. Tucker
(74) Attorney, Agent, or Firm—Thomas O. Mitchell; Robin Nave; Brigitte L. Echols

(57) ABSTRACT

Present invention relates to high brine carrier fluid, said carrier fluid selected from the group consisting of organic acids, organic acid salts, inorganic salts and combination of one or more organic acids or organic acid salts, a co-surfactant and an amount of a zwitterionic surfactant. The invention also relates to methods of treating a subterranean wellbore, including drilling, hydraulic fracturing, gravel placement, scale removing, mud cake removing, using said high brine carrier fluid.

18 Claims, 9 Drawing Sheets

VISCOELASTIC SURFACTANT FLUIDS STABLE AT HIGH BRINE CONCENTRATIONS

This application is a Continuation-in-Part of U.S. patent application Ser. No. 09/667,073 which was filed on Sep. 21, 2000 now abandoned, which is incorporated by reference in its entirety.

TECHNICAL FIELD OF THE INVENTION

This invention relates to the drilling, completion, and stimulation of hydrocarbon wells and in particular to fluids and methods for gravel packing, cleanup or drilling in a subterranean formation.

BACKGROUND OF THE INVENTION

Viscous fluids play many important roles in oilfield service applications. The viscosity of the fluids allows them to carry particles from one region of the formation, the wellbore, or the surface equipment to another. For instance, one of the functions of a drilling fluid is to carry drilling cuttings from around the drilling bit out of the wellbore to the surface. Fluid viscosity also plays an essential role for instance in gravel packing placement. Gravel packing essentially consists of placing a gravel pack around the perimeter of a wellbore across the production zone to minimize sand production from highly permeable formations.

Solid suspension properties are also an important requirement for fracturing fluids. For a well to produce hydrocarbons from a subterranean geologic formation, the hydrocarbons have to follow a sufficiently unimpeded flow path from the reservoir to the wellbore. If the formation has relatively low permeability, either naturally or through formation damages resulting for example from addition of treatment fluids or the formation of scales, it can be fractured to increase the permeability. Fracturing involves literally breaking a portion of the surrounding strata, by injecting a fluid directed at the face of the geologic formation, at pressures sufficient to initiate and/or extend a fracture in the formation. A fracturing fluid typically comprises a proppant, such as ceramic beads or sand to hold the fracture open after the pressure is released. It is therefore important for the fluid to be viscous enough to carry the proppant into the fracture.

The fluid viscosity is most commonly obtained by adding water-soluble polymers, such as polysaccharide derivatives. Recently, viscoelastic surfactants have been used as thickeners. Unlike the polymers, viscoelastic surfactants based fluids do not lead to reduction of permeability due to solid deposits, and exhibit lower friction pressure. In addition, the viscosity of the fluid is reduced or lost upon exposure to formation fluids such as for instance crude oil thereby ensuring better fracture clean-up.

Viscoelastic surfactant fluids are normally made by mixing in appropriate amounts suitable surfactants such as anionic, cationic, nonionic and zwitterionic surfactants. The viscosity of viscoelastic surfactant fluids is attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting elastic behavior. In the remaining part of this description, the term "micelle" will be used as a generic term for the organized interacting species.

Cationic viscoelastic surfactants—typically consisting of long-chain quaternary ammonium salts such as cetyltrimethylammonium bromide (CTAB)—have been so far of primarily commercial interest in wellbore fluid. Common reagents that generate viscoelasticity in the surfactant solutions are salts such as ammonium chloride, potassium chloride, sodium salicylate and sodium isocyanate and non-ionic organic molecules such as chloroform. The electrolyte content of surfactant solutions is also an important control on their viscoelastic behavior. Reference is made for example to U.S. Pat. Nos. 4,695,389, No. 4,725,372, No. 5,551,516, No. 5,964,295, and No. 5,979,557. However, fluids comprising this type of cationic viscoelastic surfactants usually tend to lose viscosity at high brine concentration (10 pounds per gallon or more). Therefore, these fluids have seen limited use as gravel-packing fluids or drilling fluids, or in other applications requiring heavy fluids to balance well pressure.

It is also known from International Patent Publication WO 98/56497, to impart viscoelastic properties using amphoteric/zwitterionic surfactants and an organic acid, salt and/or inorganic salt. The surfactants are for instance dihydroxyl alkyl glycinate, alkyl ampho acetate or propionate, alkyl betaine, alkyl amidopropyl betaine and alkylamino mono- or di-propionates derived from certain waxes, fats and oils. The surfactants are used in conjunction with an inorganic water-soluble salt or organic additives such as phthalic acid, salicylic acid or their salts. Amphoteric/zwitterionic surfactants, in particular those comprising a betaine moiety are useful at temperature up to about 150° C. and are therefore of particular interest for medium to high temperature wells. However, like the cationic viscoelastic surfactants mentioned above, they are not compatible with high brine concentration.

SUMMARY OF THE INVENTION

This invention provides a viscoelastic fluid, useful as a thickener for the suspension of particles, in particular useful as thickener for wellbore fluids, which retain viscosity at high brine concentrations.

According to a first embodiment, this invention specifically relates to a fluid comprising a high brine carrier fluid having a density of at least 10 ppg (10 pounds per gallon or 1.198 g/cm$^3$], a member selected from the group consisting of organic acids, organic acid salts, inorganic salts and combination of one or more organic acids or organic acid salts, an amount of a zwitterionic surfactant represented by the formula:

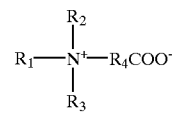

wherein $R_1$ is an alkyl, alkylarylakyl, alkoxyalkyl, alkylaminoalkyl or alkylamidoalkyl group, containing from about 12 to about 24 carbon atoms, branched or straight chains, saturated or unsaturated, and $R_2$ and $R_3$ are independently hydrogen or an aliphatic chain having from 1 to about 30 carbon atoms, and R4 is a hydrocarbyl radical having from 1 to 4 carbon atoms and a co-surfactant.

The co-surfactant increases the gel strength of the viscoelastic-based fluid, if desired. A preferred co-surfactant is a salt of an alkyl benzene sulfonate, most preferred salts being sodium dodecylbenzenesulfonate (SDBS) and sodium dodecylsulfate (SDS). Alkyl phosphonates and alkylcarboxylates may also be used. The concentration of the co-surfactant in the fluid is preferably about 0.1 wt % to about 1 wt %. More preferably, the concentration of the co-surfactant in the fluid is about 0.29 wt % to about 0.5 wt %. The compositions of the invention are also compatible with mineral and organic acids.

According to a second embodiment, this invention specifically relates to a fluid comprising a high brine carrier fluid having a density of at least 10 ppg (10 pounds per gallon or 1.198 g/cm³), a member selected from the group consisting of organic acids, organic acid salts, inorganic salts and combination of one or more organic acids or organic acid salts, an amount of a zwitterionic surfactant represented by the formula:

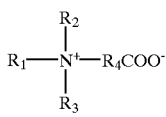

wherein $R_1$ is an alkyl, alkylarylakyl, alkoxyalkyl, alkylaminoalkyl or alkylamidoalkyl group, containing from about 12 to about 24 carbon atoms, branched or straight chains, saturated or unsaturated, and $R_2$ and $R_3$ are independently hydrogen or an aliphatic chain having from 1 to about 30 carbon atoms, and R4 is a hydrocarbyl radical having from 1 to 4 carbon atoms and a chelating agent.

The chelating agents are typically hydroxyethylaminocarboxylic acids. Preferably, the hydroxyethylaminocarboxylic acid is selected from hydroxyethylethylene-diaminetriacetic acid (HEDTA), hydroxyethyliminodiacetic acid (HEIDA), or a mixture thereof or analogous materials hydroxyalkyl, allyl or aryl-aminocarboxylic acids. Hydroxyethylaminocarboxylic acids are used essentially to remove drilling fluids deposits from the wellbore, in particular to remove filter cake. They are also used to prevent precipitation of iron species and in the removal of carbonate and sulfate scales. Ethylenediaminetetra-acetate (EDTA) is not preferred, as such a chelating agent tends to reduce the propensity for a viscous gel formation with said zwitterionic surfactants or produce a gel whose viscosity reduces with time.

At room temperature, the hydroxyethylaminocarboxylic acids may be used in presence of SDBS to improve the compatibility of the viscoelastic surfactant with the brine. However, at higher temperature such as typically encountered in a wellbore, the co-surfactant must be omitted if the brine phase comprises hydroxyethylaminocarboxylic acids, otherwise the gel is destroyed.

The carrier fluid is a brine, i.e. water comprising an inorganic salt or organic salt. Preferred inorganic monovalent salts include alkali metal halides, more preferably sodium, potassium or caesium bromide. Sodium bromide is especially preferred. The carrier brine phase may also comprise an organic salt more preferably sodium or potassium formate. Preferred inorganic divalent salts include calcium halides, more preferably calcium chloride or calcium bromide. Zinc halides, especially zinc bromide, are not preferred, as it has been observed that this salt tends to reduce the viscosity of the viscoelastic-based solution. The salt is chosen for compatibility reasons i.e. where the reservoir drilling fluid used a particular brine phase and the completion/ clean up fluid brine phase is chosen to have the same brine phase. In cases where hydroxyethylaminocarboxylic acids are used for wellbore clean up, the brine would preferably consists essentially of monovalent salts since divalent salts will be chelated making less of the hydroxyethylaminocarboxylic acid available for clean up.

The concentration of the salts in the fluid is at least high enough to bring the density of the carrier fluid to at least about 10 ppg, and preferably from about 10 ppg to about 15 ppg. Inorganic salt can be added to the carrier fluid in any hydration state (i.e. anhydrous, monohydrated, dihydrated, etc.). Organic salts such as formates may be added to the formulation up to approximately 9.5 ppg above which phase separation might occur; and consequently, some inorganic salts need to be further added to reach a density higher than 10 ppg. The tolerance of the zwitterionic surfactant to electrolyte also allows formulations below 10 ppg where the brine phase is chosen to be compatible with the brine phase of other completion or reservoir drilling fluids e.g. HCOOK or HCOONa at ca. 24 wt % (9.5 ppg) or below.

The viscoelastic zwitterionic surfactant is capable of forming structures such are micelles, that are sheet-like, spherical, vesicular, or worm-like, this latter form being preferred. A most preferred zwitterionic surfactant comprises a betaine moiety and an oleic acid moiety, such as the surfactant in BET-O-30 (Rhodia). It should be noted that the oleic acid stock from which the oleic acid moiety is derived is generally about 75% pure to about 85% pure, and the balance of the stock comprises other fatty acids, such as linolic acid, linoleic acid, etc. Some of these other fatty acids may be present in about 15% to about 25% of the molecules of the surfactant in place of the oleic acid.

The concentration of the viscoelastic surfactant in the solution is preferably between about 1 wt % and about 10 wt %. More preferably, the concentration is about 2.9 wt % to about 5 wt %.

Other components can be included in the fluid, such as scale and corrosion inhibitors or biocides, depending on its intended use, formation conditions and other parameters readily apparent to one of ordinary skill in the art. For example, as a drilling fluid, it preferably further comprises surface active agents, other viscosifiers such as polymers, filtration control agents such as Gilsonite and modified starches, density increasing agents such as powdered barites or hematite or calcium carbonate, or other wellbore fluid additives known to those skilled in the art.

As a gravel packing fluid, it preferably comprises gravel and other optional additives such as filter cake clean up reagents such as chelating agents referred to above or acids (e.g. hydrochloric, hydrofluoric, formic, acetic, citric acid) corrosion inhibitors, scale inhibitors, biocides, leak-off control agents, among others. For this application, suitable gravel or sand is typically having a mesh size between 8 and 70 U.S. Standard Sieve Series mesh.

When used as a fracturing fluid, it preferably comprises a proppant. Suitable proppants include, but are not limited to, sand, bauxite, glass beads, and ceramic beads. If sand is used, it will typically be from about 20 to about 100 U.S. Standard Mesh in size. Mixtures of suitable proppants can be used. It can also comprise a proppant flowback inhibitor, for instance the proppant can be coated with a resin to allow consolidation of the proppant particles into a mass. The concentration of proppant in the fracturing fluid can be any concentration known in the art, and will typically be in the range of about 0.5 to about 20 pounds of proppant added per gallon of clean fluid.

Another aspect of the present invention is a method of treating a wellbore including the step of injecting a high density brine carrier fluid comprising a viscoelastic zwitterionic surfactant and a co-agent such as SDBS or a chelating agent. By "treatment', it is hereby understood for instance drilling, hydraulic fracturing and gravel pack placement. As to drilling, the viscoelastic fluid is injected into the wellbore at a flow rate and pressure sufficient to lubricate the drilling bit and carry cuttings to the surface. For hydraulic fracturing, the method includes the step of injecting a viscoelastic-based fluid composition via a wellbore into a subterranean formation at a flow rate and pressure sufficient to produce or extend a fracture in the formation. For placing a gravel pack, the method includes the step of injecting the viscoelastic-based fluid composition comprising gravel into a wellbore at a flow rate and pressure sufficient to emplace a gravel pack in the wellbore. Preferably, the method is performed in formations having a temperature less than about 260° F. (126.7° C.) and preferably using alternate path technology known for instance from U.S. Pat. No. 4,945,991.

Regardless of the intended use, the fluid can be prepared at any time prior to use by combining the viscoelastic surfactant, the co-surfactant and or the chelating agent, and the high density brine carrier fluid, as well as any further components. The viscoelastic surfactant typically can be provided in an aqueous solution, but also can be provided in any other form. The high density brine carrier fluid can be prepared by the addition of the inorganic salt to the carrier fluid any time before, during, or after addition of the viscoelastic surfactant to the fluid. Additives to be included in the fluid can be added to the fluid at any time prior to use or even added to the fluid after it has been injected into the wellbore.

The compositions and methods of the present invention provide several substantial advantages over prior fluids and methods. Though not to be bound by theory, it is believed that the co-agent/co-surfactant functions to allow the VES to substantially retain its viscosity in the presence of high inorganic or organic salt concentrations. The fluids retain sufficient viscosity without SDBS co-surfactant if the fluid formulation also comprises some chelating agents such as HEDTA or HEIDA. The present invention also is relatively simple and inexpensive to manufacture.

DETAILED DESCRIPTION OF PREFERRED EMBODIMENTS

Figure 1:
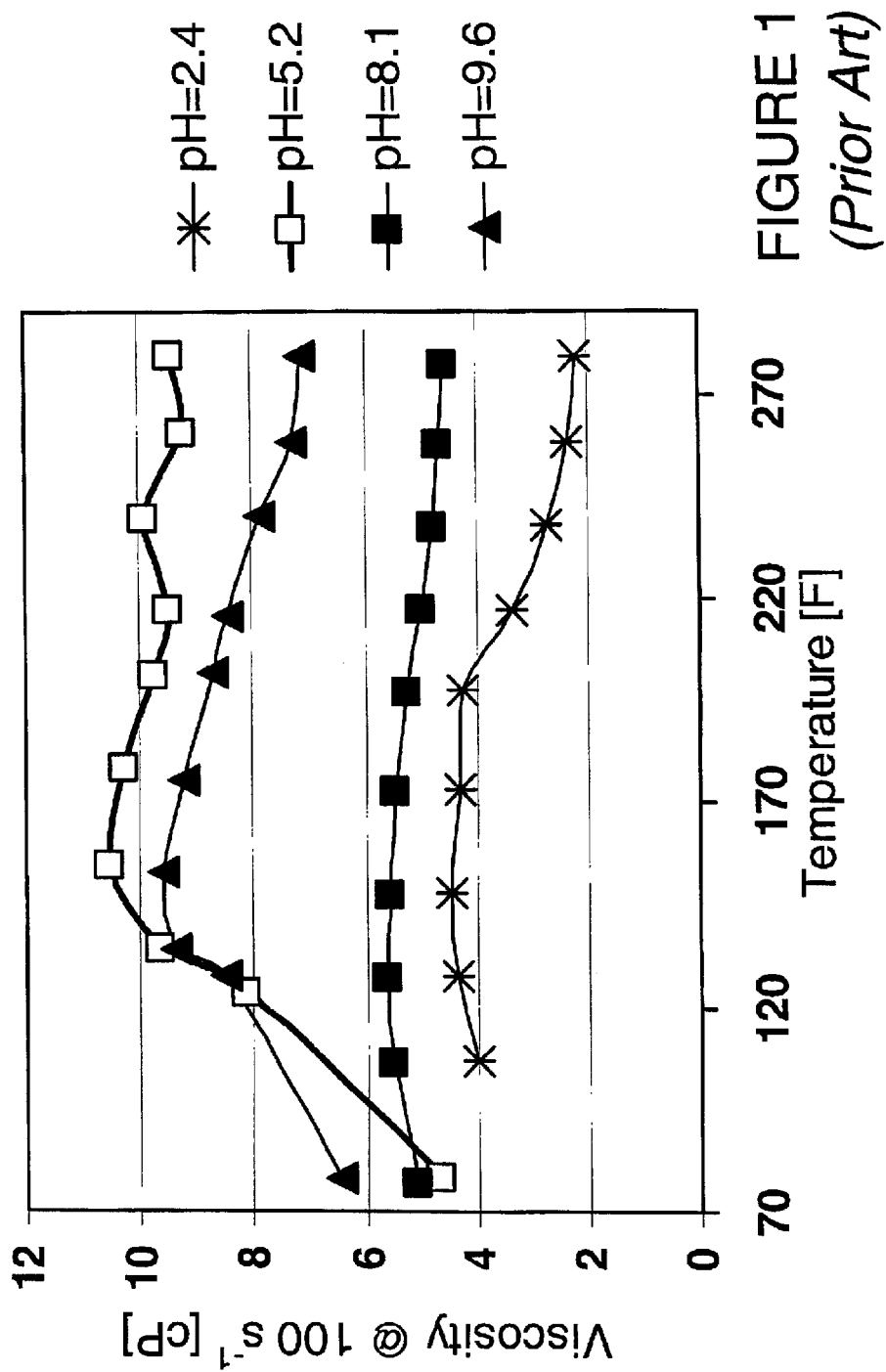
FIG. 1 shows viscosity as a function of temperature for a test solution of a 12 ppg calcium bromide brine comprising a zwitterionic surfactant, in absence of a co-surfactant.

While the compositions of the present invention are described herein as comprising certain materials, it should be understood that the composition can optionally comprise two or more chemically different such materials. In addition, the composition can also comprise some components others than the ones already cited.

For instance, the zwitterionic surfactant may be used in combination with other viscoelastic surfactants, including erucyl bis(2-hydroxyethyl) methyl ammonium chloride; erucyl trimethyl ammonium chloride; N-methyl-N,N-bis(2-hydroxyethyl) rapeseed ammonium chloride; oleyl methyl bis(hydroxyethyl) ammonium chloride; octadecyl methyl bis(hydroxyethyl) ammonium bromide; octadecyl tris (hydroxyethyl) ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis(hydroxyethyl) ammonium 3,4,-dichlorobenzoate; cetyl tris(hydroxyethyl) ammonium iodide; bis(hydroxyethyl) soya amine; N-methyl, N-hydroxyethyl tallow amine; bis(hydroxyethyl) octadecyl amine; cosyl dimethyl hydroxyethyl ammonium bromide; cosyl methyl bis(hydroxyethyl) ammonium chloride; cosyl tris(hydroxyethyl) ammonium bromide; dicosyl dimethyl hydroxyethyl ammonium bromide; dicosyl methyl bis(hydroxyethyl) ammonium chloride; dicosyl tris (hydroxyethyl) ammonium bromide; hexadecyl ethyl bis (hydroxyethyl) ammonium chloride; hexadecyl isopropyl bis(hydroxyethyl) ammonium iodide; N,N-dihydroxypropyl hexadecyl amine; N-methyl, N-hydroxyethyl hexadecyl amine; N,N-dihydroxyethyl dihydroxypropyl oleyl amine; N,N-dihydroxypropyl soya amine; N,N-dihydroxypropyl tallow amine; N-butyl hexadecyl amine; N-hydroxyethyl octadecyl amine; N-hydroxyethyl cosyl amine; cetylamino, N-octadecyl pyridinium chloride; N-soya-N-ethyl morpholinium ethosulfate; methyl-1-oleyl amido ethyl-2-oleyl imidazolinium-methyl sulfate; and methyl-1-tallow amido ethyl-2-tallow imidazolinium-methyl sulfate.

The fracturing fluid can also comprise a breaker. The purpose of this component is to "break" or diminish the viscosity of the fracturing fluid so that this fluid is more easily recovered from the fracture during clean-up. Exemplary breakers include citric acid as described in U.S. patent application Ser. No. 09/826,127 filed on Apr. 4, 2001, which is incorporated herein by reference.

The fluid can further contain one or more additives such as surfactants, breaker aids, salts (e.g., potassium chloride), anti-foam agents, scale inhibitors, and bactericides. Also optionally, the fracturing fluid can contain materials designed to limit proppant flowback after the fracturing operation is complete by forming a porous pack in the fracture zone. Such materials, herein "proppant flowback inhibitors," can be any known in the art, such as are available from Schlumberger under the trade name Propnet™.

In another embodiment, the present invention relates to a method of hydraulically fracturing a subterranean formation. Techniques for hydraulically fracturing a subterranean formation will be known to persons of ordinary skill in the art, and will involve pumping the fracturing fluid into the borehole and out into the surrounding formation. The fluid pressure is above the minimum in situ rock stress, thus creating or extending fractures in the formation. See *Stimulation Engineering Handbook*, John W. Ely, Pennwell Publishing Co., Tulsa, Okla. (1994).

In yet another embodiment, the present invention relates to a method of drilling a wellbore. The method comprises providing a wellbore completion fluid as described above, injecting the fluid into a nascent wellbore in which is acting a drilling bit, and removing cuttings from around the drilling bit with the wellbore completion fluid.

In still another embodiment, the present invention relates to a method of gravel packing a wellbore. Gravel packing is typically only used on unconsolidated formations, which tend to produce an undesirably high level of particulates together with the formation fluids. The method involves the placement of a solution comprising a quantity of gravel and/or sand having a mesh size between 8 and 70 U.S. Standard Sieve Series mesh into the formation adjacent to the wellbore. It is sometimes desirable to bind the gravel particles together to form a porous matrix for passage of formation fluids while facilitating the filtering out and retainment in the well of the bulk of the unconsolidated sand and/or fines transported to the near wellbore area by the formation fluids or hydrocarbon (gas). The gravel particles can constitute a resin-coated gravel, which is either pre-cured or can be cured by an overflush of a chemical binding agent once the gravel is in place. In some instances, various binding agents have been applied to the gravel particles to bind them together, forming a porous matrix. The gravel or sand is placed in the formation adjacent to the wellbore by injecting a fluid according to the present invention and the gravel or sand into the wellbore. Optionally, fluids of the invention are then removed from the emplaced gravel or sand.

Fluids were prepared comprising as zwitterionic viscoelastic surfactant a betaine-oleic acid, a product obtained as BET-O-30 from Rhodia Inc, United States. BET-O-30 is an aqueous solution comprising 29% betaine-oleic acid surfactant (oleamidopropyl betaine), 17% propylene glycol and 48.5% water. A solution in a salt solution of calcium bromide brine (12 ppg) is prepared with 10% BET-O-30 (all percentages are volume percent unless otherwise specified). The concentration of betaine-oleic acid viscoelastic surfactant was thus 2.9%. The pH of the solution was adjusted using concentrated chloride acid. Fluid viscosity was recorded using a Fann 50 cylindrical rotational viscometer.

FIG. 1 shows the resulting viscosity in centipoises [cP] at a shear rate of 100 $s^{-1}$ as a function of the temperature over the range 70 to 270° F. (from about 21° C. to about 130° C.) of fluids comprising water with calcium bromide brine and a betaine-oleic surfactant, for different values of pH. The results show that virtually no increase of the viscosity was obtained.

Figure 2:
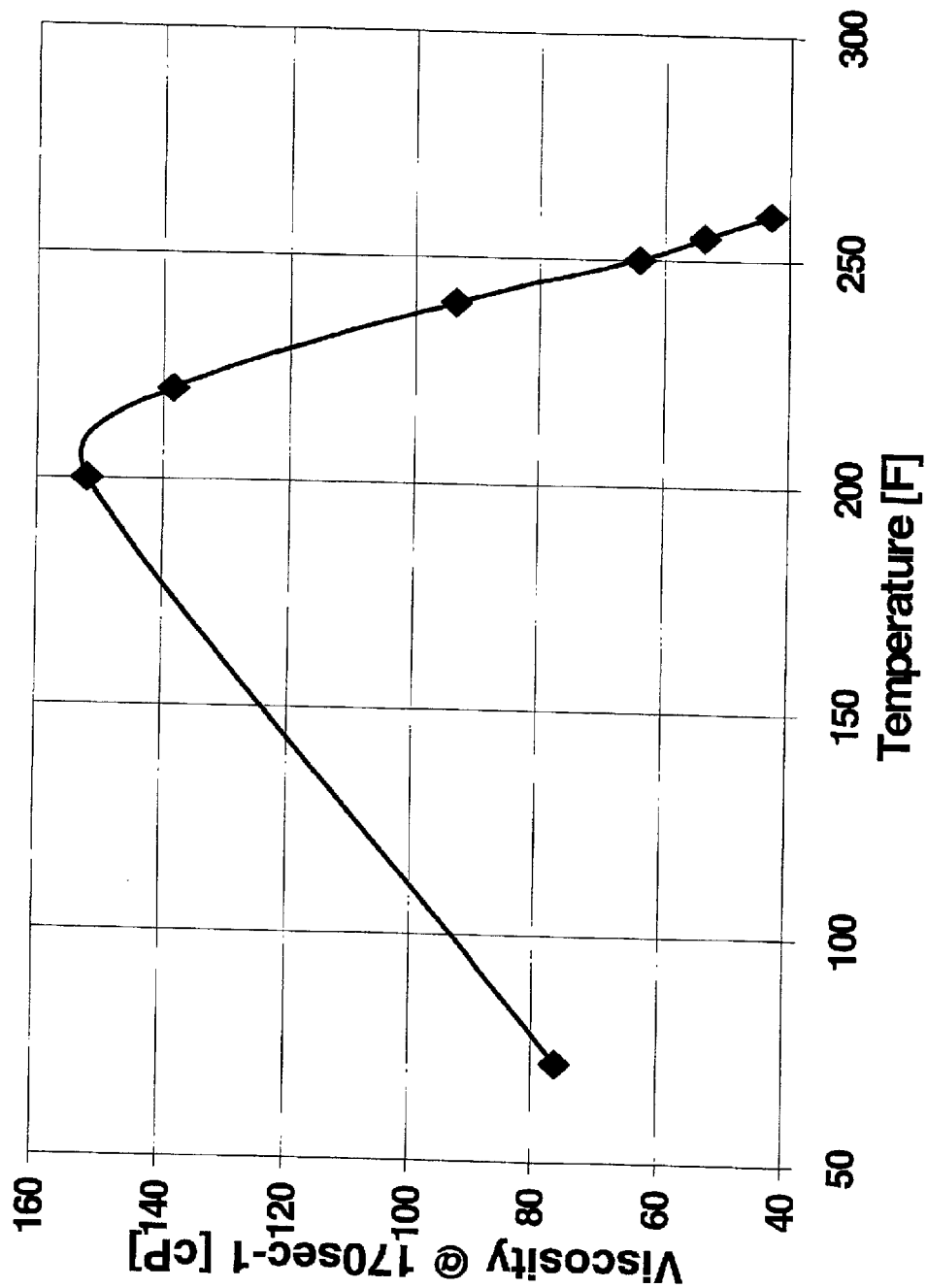
FIG. 2 shows viscosity as a function of temperature for a fluid comprising a sodium bromide saturated brine, a zwitterionic surfactant and a co-surfactant.

In a similar manner, a fluid was prepared based on a salt saturated sodium bromide brine, with 10% BET-O-30 and in addition, 0.3% SDBS, in aqueous solution of 12.7 ppg density. The test solution did not undergo phase separation at saturated sodium bromide brine concentrations. The solution was agitated, and then agitation was stopped. FIG. 2 shows the viscosity at 170 $s^{-1}$ as a function of the temperature over the same range of temperature. The results show that it is possible to produce gels using a zwitterionic surfactant, a co-surfactant and a high density brine.

Figure 3:
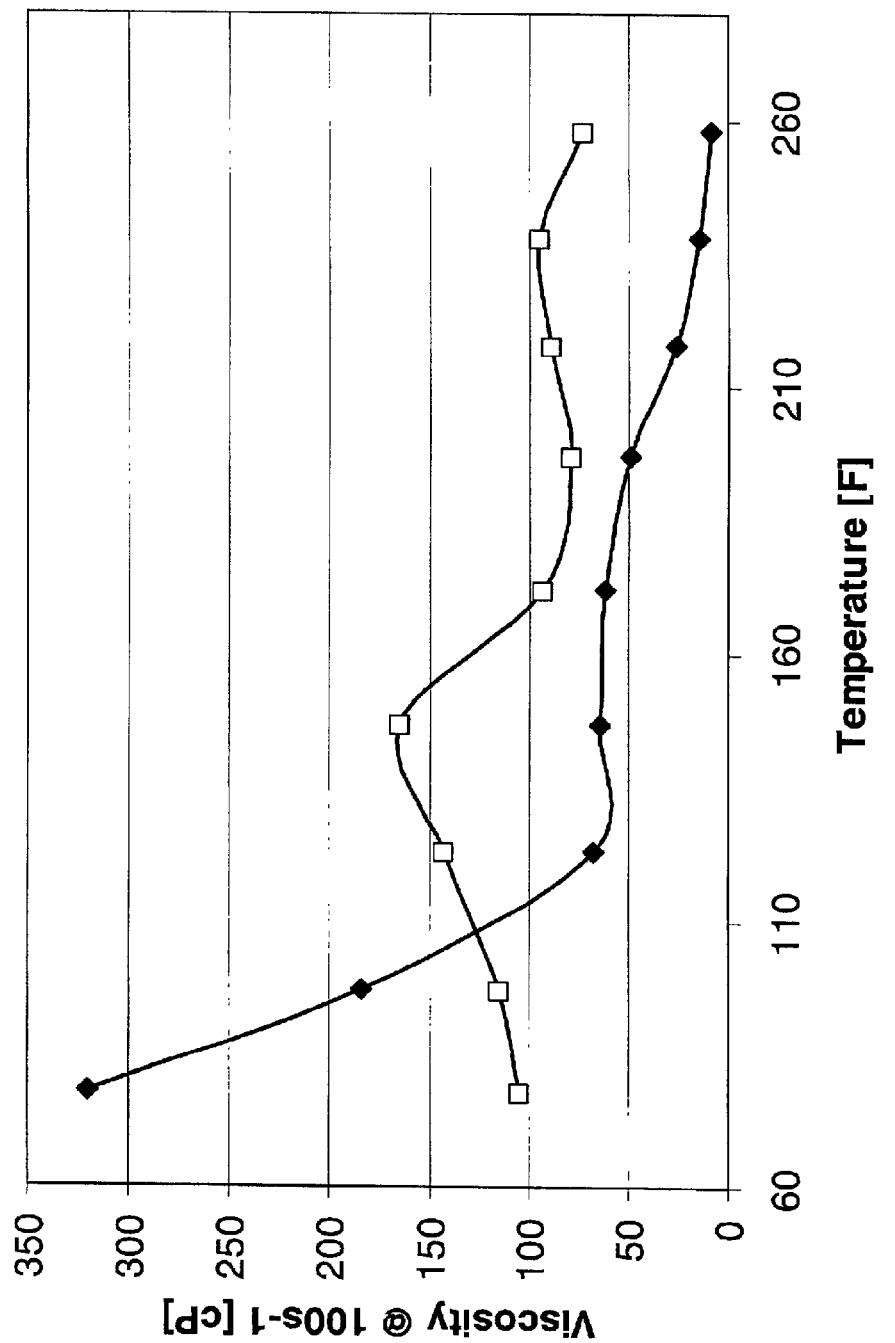
FIG. 3 shows viscosity as a function of temperature for fluids comprising calcium chloride brines, a zwitterionic surfactant and a co-surfactant.

Similar tests were performed with divalent brines. FIG. 3 shows viscosity as a function of temperature for test solutions consisting of calcium chloride brine with 10% BET-O-30 and 0.3% SDBS. One of the tested solutions comprised 48% $CaCl_2$ (filled diamonds) and the other 80% $CaCl_2$ (10.74 lb/gal) (open squares). The viscosity of the test solution comprising 80% $CaCl_2$ was roughly 2- to 3-fold higher than the viscosity of the test solution with lower concentration of calcium chloride at temperatures greater than about 120° F. up to about 260° F.

Figure 4:
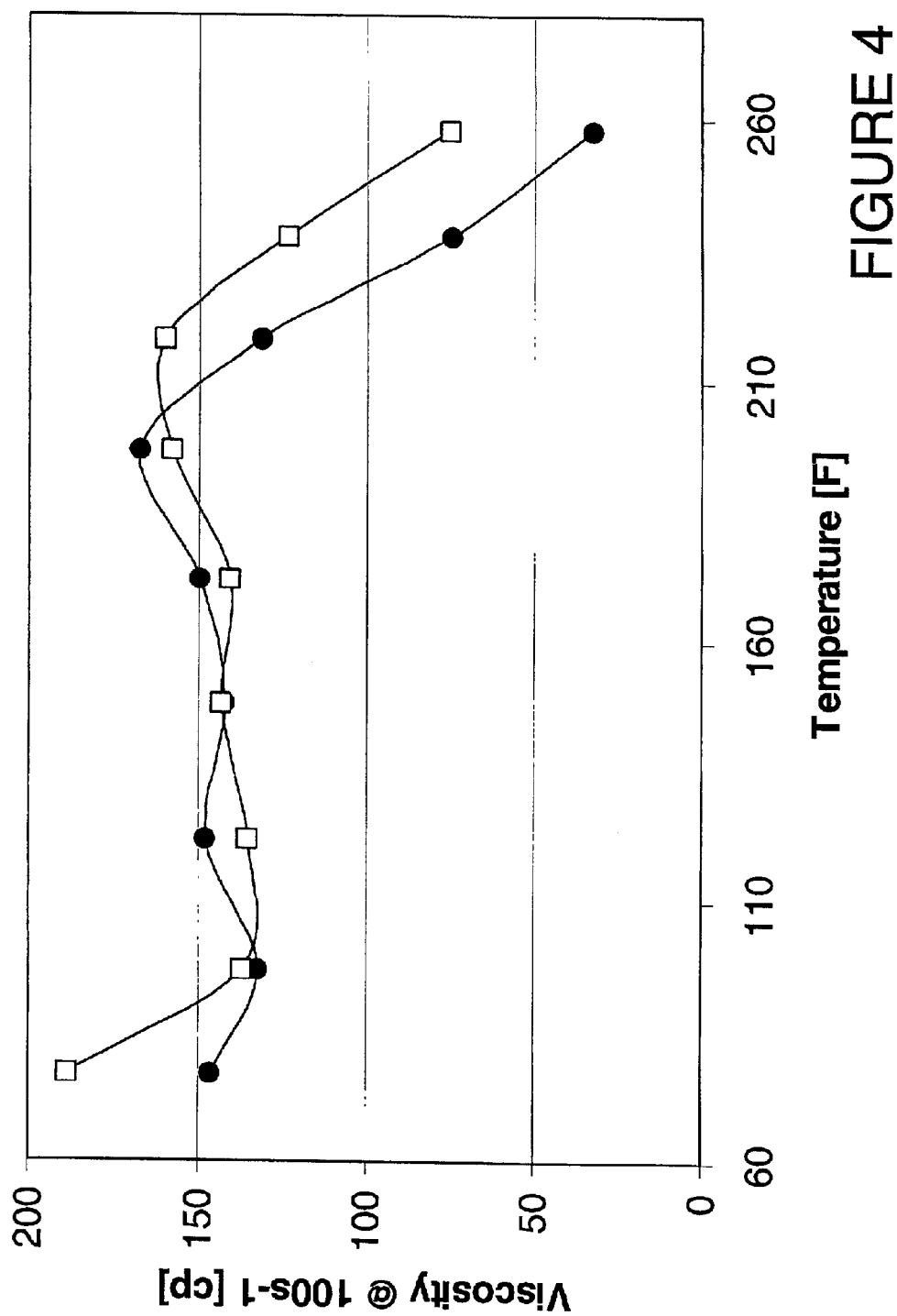
FIG. 4 shows viscosity as a function of temperature for fluids comprising calcium bromide brines, a zwitterionic surfactant and a co-surfactant.

FIG. 4 shows viscosity as a function of temperature for similar solutions weighted with calcium bromide. The filled circles marks are representative of a solution with 60% $CaBr_2$, having a density of 11.5 lb/gal (1.378 g/cm$^3$). The open squares are representative of a solution with 100% $CaBr_2$, having a density of 12.98 lb/gal (1.555 g/cm$^3$). The viscosity of both samples had a roughly constant viscosity of about 130 cp at 100 $s^{-1}$, at temperatures up to about 220° F. (104° C.). Also, to investigate whether the test solution would undergo phase separation at very high brine concentrations, the test solution was prepared with 160% $CaBr_2$ [$\rho$=1.79 g/cm$^3$ at room temperature, 14.94 lb/gal]. The solution was agitated, and then agitation was removed. The resulting mixture showed no phase separation after about 2–3 days at room temperature, although the viscosity of the solution was relatively low.

Figure 5:
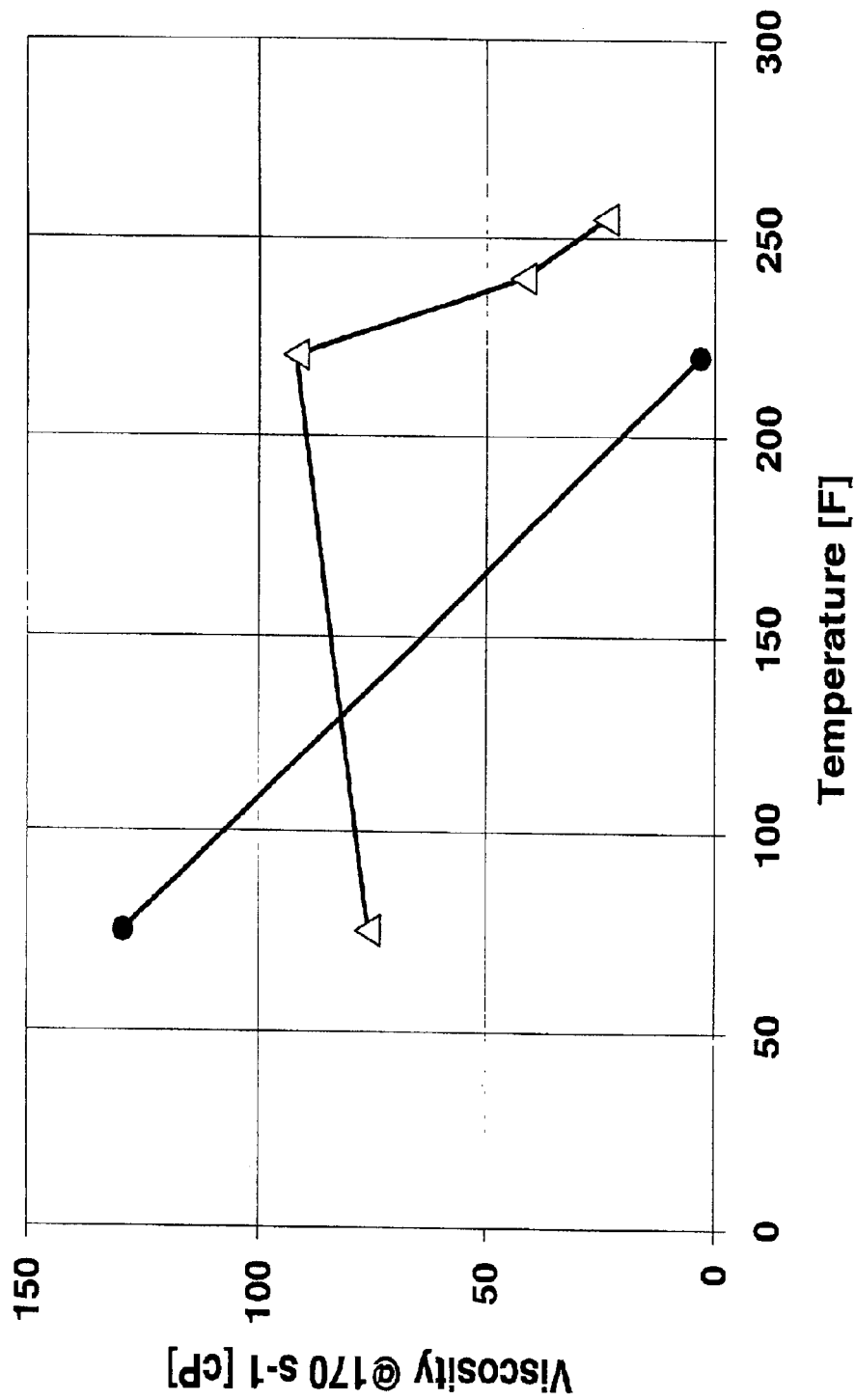
FIG. 5 shows viscosity as a function of temperature for fluids comprising sodium bromide brines, a zwitterionic surfactant, HEDTA as chelating agent and optionally, a co-surfactant.

Additional fluids were prepared to test the compatibility of the viscoelastic monovalent brine with a chelating agent. FIG. 5 shows the viscosity at 170 $s^{-1}$ as a function of the temperature of fluids weighted with sodium bromide brine to reach a density of 12.7 lb/gal (1.521 g/cm$^3$). The fluids comprised 10% BET-O-30, 0.2% corrosion inhibitor, and 40% of a chelating agent solution comprising 50 wt % of HEDTA in water. The pH of the brine solution was reduced to 4 by addition of chloride acid. To one fluid (filled circles), 0.3% SDBS was added; the other fluid (open triangle) did not include SDBS. This test shows that the monovalent brines of the invention are compatible with some chelating agents but that chelating agents should not be used in combination with co-surfactants at wellbore temperatures.

Figure 6:
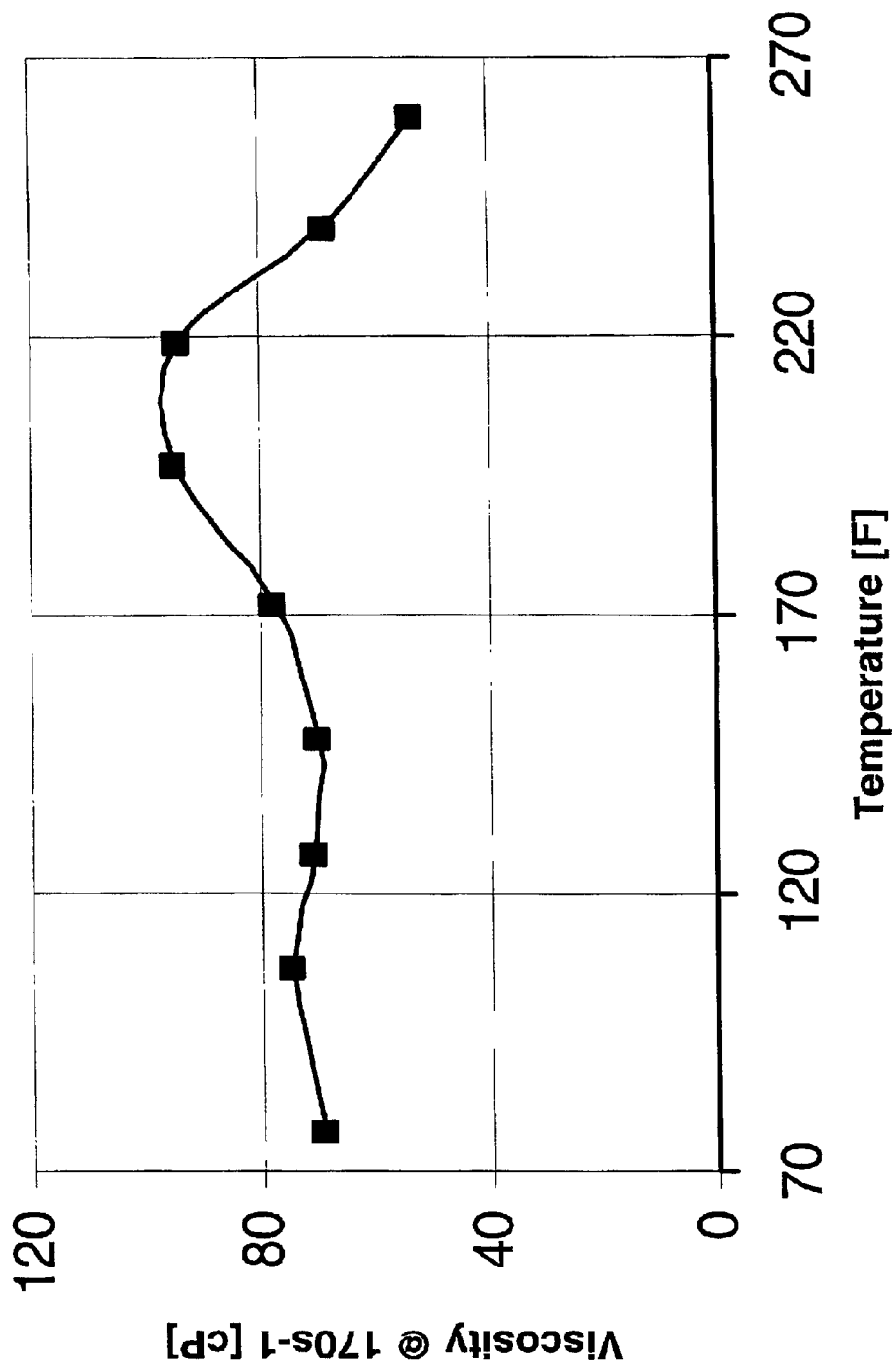
FIG. 6 shows viscosity as a function of temperature for a fluid comprising a sodium bromide brine, a zwitterionic surfactant and HEIDA as chelating agent.

Similar results are obtained with HEIDA as chelating agent. FIG. 6 shows viscosity at 170 $s^{-1}$ as a function of the temperature of a fluid comprising 10% BET-O-30, weighted to 11.6 ppg with sodium bromide brine, and 30% of a chelating agent solution consisting of a solution at 50% of HEIDA in water. The pH was reduced to 7 with chloride acid.

Figure 7:
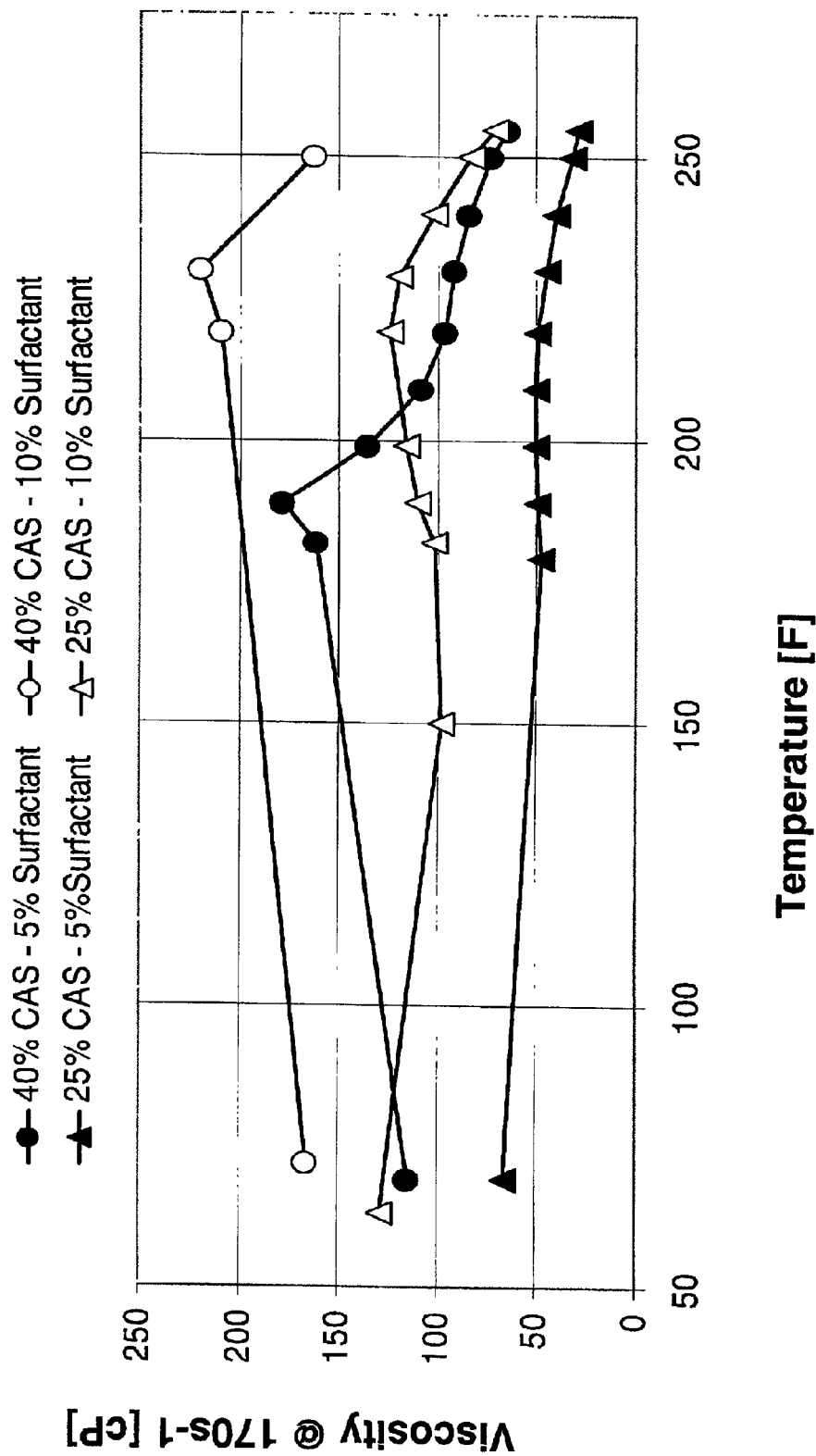
FIG. 7 shows viscosity as a function of temperature for a fluid comprising a calcium bromide brine, various concentrations of HEDTA as chelating agent and various concentrations of a zwitterionic surfactant.

As shown in FIG. 7, the use of chelating agent also promotes compatibility with divalent brine. The fluids comprised 5% (filled marks) or 10% (open marks) BET-O-30 and were weighted with calcium bromide so that the fluid density was 13.7 lb/gal (1.641 g/cm$^3$). 25% (triangles) and 40% (circles) of a solution at 50% of HEDTA was added and the pH reduced to 2 with chloride acid.

Figure 8:
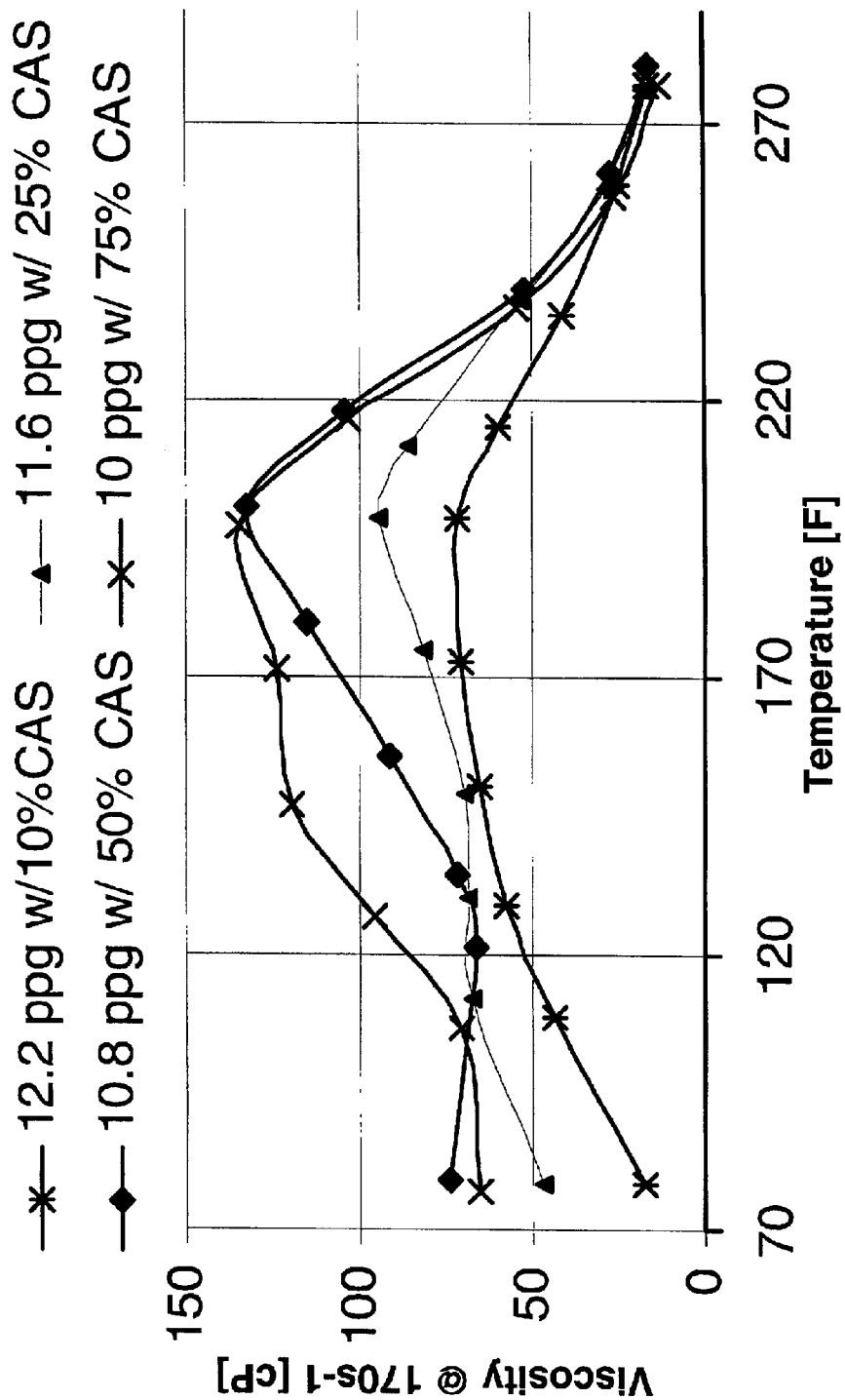
FIG. 8 shows viscosity as a function of temperature for a fluid comprising various concentrations of HEDTA as chelating agent with sodium bromide at various concentrations lower than saturated.

Additional fluids were prepared to show that sodium bromide salt concentrations lower than saturated were also compatible and that a viscous gel appropriate for application was produced. FIG. 8 shows viscosity at 170 $s^{-1}$ as a function of the temperature of fluids weighted with sodium bromide brine, various concentrations of chelating agent solution CAS (a solution comprising 50 wt % of HEDTA in water) and 10% BET-O-30 at pH reduced to pH 4.5 with chloride acid.

Figure 9:
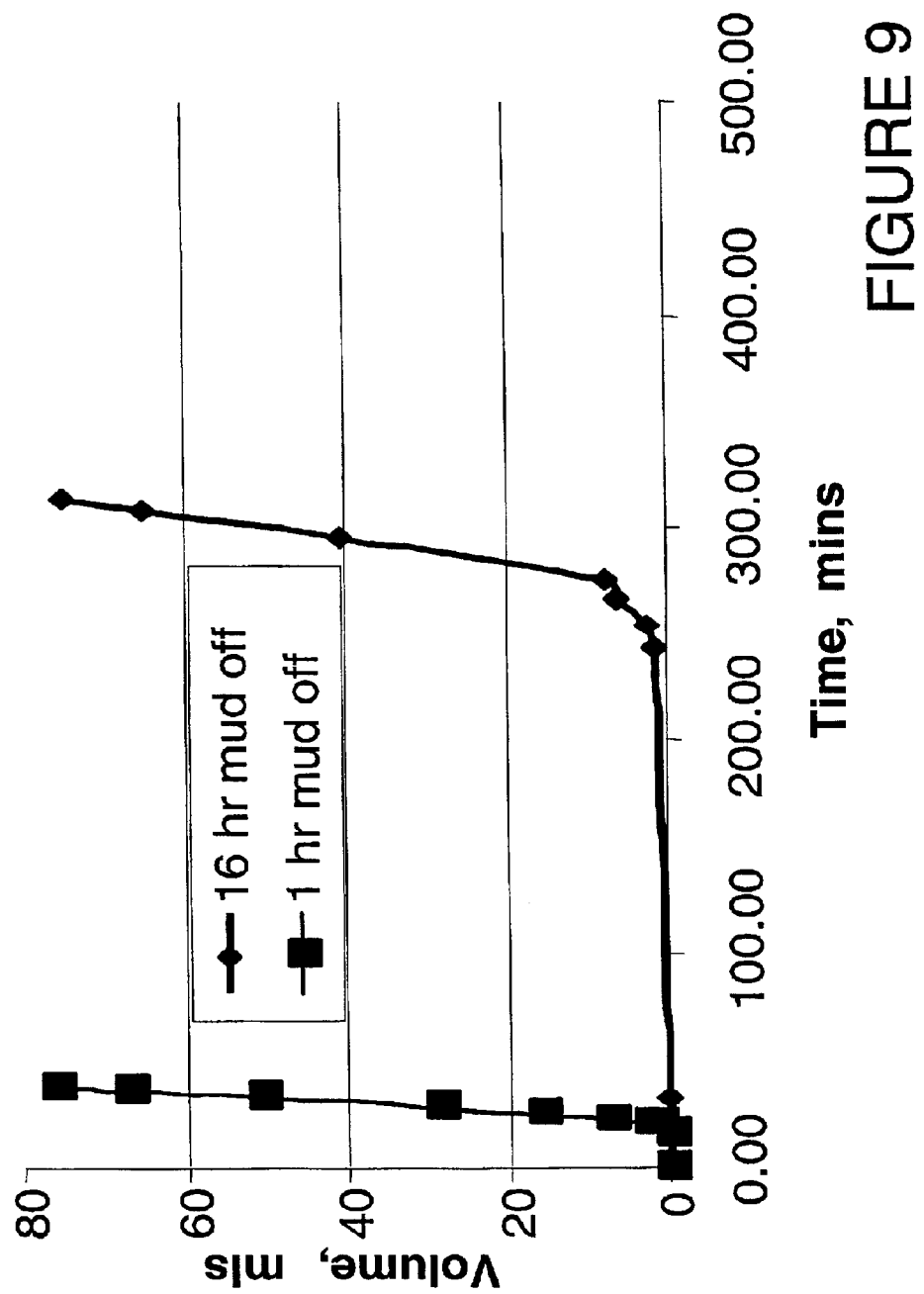
FIG. 9 shows Leak off volume vs time after a clean up treatment with a fluid according to the invention.

FIG. 9 shows the time required for a chelating agent containing fluid (10% BET-O-30 and HEDTA at pH 4.5) to degrade an oil-based synthetic reservoir drilling fluid filter cake created on a 500 mD berea sandstone core at 175° F. (79.4° C.) and 300 psi (2.068 MPa) for 16 hours. The chelating agent solutions were made up in viscoelastic surfactant gels. The viscous clean up treatments were then applied within a 20/40 mesh sand gravel pack at 300 psi overbalance and at 175° F. The treatment fluid was a gravel pack carrier fluid comprising BET-O-30, with HEDTA.

The preceding description of specific embodiments of the present invention is not intended to be a complete list of every possible embodiment of the invention. Persons skilled in this field will recognize that modifications can be made to the specific embodiments described here that would be within the scope of the present invention.

What is claimed is:

1. A wellbore fluid, comprising a high brine carrier fluid having a density of at least 10 pounds per gallon, and comprising an inorganic salt selected among sodium, potassium or cesium bromide and optionally a member selected from the group consisting of organic acids, organic acid salts, and combination of one or more organic acids or organic acid salts, a co-surfactant, selected among sodium dodecylbenzenesulfonate (SDBS), sodium dodecylsulfate (SDS), and mixture thereof, and an amount of a zwitterionic surfactant represented by the formula:

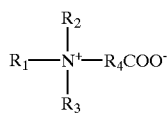

wherein $R_1$ is an alkyl, alkylarylakyl, alkoxyalkyl, alkylaminoalkyl or alkylamidoalkyl group, containing from about 12 to about 24 carbon atoms, branched or straight chains, saturated or unsaturated, and $R_2$ and $R_3$ are independently hydrogen or an aliphatic chain having from 1 to about 30 carbon atoms, and R4 is a hydrocarbyl radical having from 1 to 4 carbon atoms.

2. A wellbore fluid, comprising a high density brine carrier fluid, said carrier fluid having a density of at least 10 pounds per gallon, a member selected from the group consisting of organic acids, organic acid salts, inorganic salts and combination of one or more organic acids or organic acid salts, an amount of a zwitterionic surfactant represented by the formula:

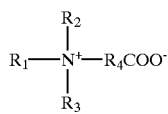

wherein $R_1$ is an alkyl, alkylarylakyl, alkoxyalkyl, alkylaminoalkyl or alkylamidoalkyl group, containing from about 12 to about 24 carbon atoms, branched or straight chains, saturated or unsaturated, and $R_2$ and $R_3$ are independently hydrogen or an aliphatic chain having from 1 to about 30 carbon atoms, and R4 is a hydrocarbyl radical having from 1 to 4 carbon atoms and an hydroxyethylaminocarboxylic acid or analogous materials hydroxyalkyl, allyl or aryl-aminocarboxylic acid.

3. The fluid of claim 2, wherein said hydroxyethylaminocarboxylic acid is selected from hydroxyethylethylenediaminetriacetic acid (HEDTA), hydroxyethyliminodiacetic acid (HEIDA), or a mixture thereof or analogous materials hydroxyalkyl, allyl or aryl-aminocarboxylic acids.

4. The fluid of claim 3, wherein the inorganic salt or mixture of inorganic salts essentially consists of monovalent salts.

5. The fluid of claim 4, wherein the monovalent salts are alkali metal halides.

6. The fluid of claim 5, wherein said alkali metal halide is sodium, potassium or cesium bromide.

7. The fluid of claim 2, further comprising an organic salt.

8. A method of treating a subterranean wellbore comprising the step of injecting into the wellbore the high density brine carrier fluid of claim 2.

9. The method of claim 8, wherein said method of treating a well includes at least one of the following operations: drilling, hydraulic fracturing, gravel placement, scale removing, mud cake removing.

10. A wellbore fluid, comprising a high brine carrier fluid having a density of at least 12.5 pounds per gallon, and comprising an inorganic salt and optionally a member selected from the group consisting of organic acids, organic acid salts, and combination of one or more organic acids or organic acid salts, a co-surfactant, and an amount of a zwitterionic surfactant represented by the formula:

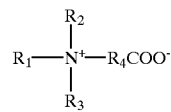

wherein $R_1$ is an alkyl, alkylarylakyl, alkoxyalkyl, alkylaminoalkyl or alkylamidoalkyl group, containing from about 12 to about 24 carbon atoms, branched or straight chains, saturated or unsaturated, and $R_2$ and $R_3$ are independently hydrogen or an aliphatic chain having from 1 to about 30 carbon atoms, and R4 is a hydrocarbyl radical having from 1 to 4 carbon atoms.

11. The fluid of claim 10, wherein the co-surfactant is selected among salts of an alkyl benzene sulfonate.

12. The fluid of claim 10, wherein the co-surfactant is selected among sodium dodecylbenzenesulfonate (SDBS), sodium dodecylsulfate (SDS), and mixture thereof.

13. The fluid of claim 10, wherein the zwittenonic surfactant comprises a betaine moiety and an oleic acid moiety.

14. The fluid of claim 10, wherein the brine essentially comprises divalent salts.

15. The fluid of claim 14, wherein said divalent salts are alkaline earth halides.

16. The fluid of claim 14, wherein the brine essentially consists of calcium chloride; calcium bromide; a combination of calcium bromide and zinc bromide, or mixture thereof.

17. The fluid of claim 10, wherein the brine essentially comprises monovalent salts.

18. The fluid of claim 17, wherein said monovalent salt are alkali metal halides.

* * * * *